United States Patent
Lum et al.

(10) Patent No.: US 9,684,998 B2
(45) Date of Patent: Jun. 20, 2017

(54) PIXEL SERIALIZATION TO IMPROVE CONSERVATIVE DEPTH ESTIMATION

(71) Applicant: NVIDIA CORPORATION, Santa Clara, CA (US)

(72) Inventors: Eric B. Lum, San Jose, CA (US); Justin Cobb, Toney, AL (US); Barry N. Rodgers, Madison, AL (US)

(73) Assignee: NVIDIA CORPORATION, Santa Clara, CA (US)

( * ) Notice: Subject to any disclaimer, the term of this patent is extended or adjusted under 35 U.S.C. 154(b) by 427 days.

(21) Appl. No.: 13/947,745

(22) Filed: Jul. 22, 2013

(65) Prior Publication Data

US 2015/0022519 A1    Jan. 22, 2015

(51) Int. Cl.
*G06T 15/40* (2011.01)
*G06T 17/05* (2011.01)

(52) U.S. Cl.
CPC .................... *G06T 17/05* (2013.01)

(58) Field of Classification Search
None
See application file for complete search history.

(56) References Cited

U.S. PATENT DOCUMENTS

| 7,755,624 B1 * | 7/2010 | Hakura et al. | 345/421 |
| 2002/0196251 A1 * | 12/2002 | Duluk et al. | 345/420 |
| 2011/0298813 A1 * | 12/2011 | Barringer et al. | 345/506 |

* cited by examiner

*Primary Examiner* — Barry Drennan
*Assistant Examiner* — Diana Hickey
(74) *Attorney, Agent, or Firm* — Artegis Law Group, LLP (57) ABSTRACT

One embodiment includes determining a first z-range for a first portion of a coarse raster tile, where the first portion includes a plurality of pixels having a first set of pixel locations, retrieving from a memory a corresponding z-range related to a second set of pixel locations associated with the coarse raster tile, where the first set of pixel locations comprises a subset of the second set of pixel locations, and comparing the first z-range to the corresponding z-range to determine whether the plurality of pixels is occluded. If the plurality of pixels determined to be occluded, then the plurality of pixels is culled. If the plurality of pixels is determined to not be occluded, then the plurality of pixels is transmitted to a fine raster unit for further processing. The coarse raster tile comprises a plurality of portions, including the first portion, and those portions are processed serially.

20 Claims, 5 Drawing Sheets

PIXEL SERIALIZATION TO IMPROVE CONSERVATIVE DEPTH ESTIMATION

BACKGROUND OF THE INVENTION

Field of the Invention

Embodiments of the present invention relate generally to graphics processing and, more specifically, to pixel serialization to improve conservative depth estimation.

Description of the Related Art

Conventional graphics rendering pipelines include a rasterization stage in which geometry and vertex data are converted into fragment and pixel data. The resulting pixel data typically includes several attributes for each pixel, including the depth of the pixel, which reflects how far the geometry covering the pixel is from the view plane. The depth value is known as the "z-value" for the pixel. After rasterization, the pixels continue through the graphics pipeline where shading and texturing operations are performed to determine the final color value for each pixel.

In many graphics pipeline architectures, a "z-test" is one of the last operations performed. In z-testing, the z-value of a current pixel exiting the shading and texturing portion of the pipeline is compared to the z-value stored at a pixel location in frame buffer memory corresponding to the current pixel. The z-value stored in the frame buffer memory at this particular pixel location reflects the depth of the shallowest primitive thus far processed covering the pixel location. This pixel location is referred to herein as the "stored pixel." Typically, if the z-value of the stored pixel is less than the z-value of the current pixel, then the current pixel is deemed occluded, and the current pixel is discarded. However, if the z-value of the current pixel is less than the z-value of the stored pixel, then the current pixel is deemed to be "in front" of the stored pixel, and the current pixel replaces the stored pixel in the frame buffer.

Conventional z-testing at the end of the graphics pipeline presents several problems. First, such an approach results in unnecessarily processing occluded pixels. Second, because the frame buffer oftentimes resides in off-chip memory, such an approach consumes memory bandwidth unnecessarily by requiring data transfers to and from the frame buffer for every pixel. Third, unnecessary power is consumed by processing occluded pixels and performing memory operations for every pixel.

Techniques for addressing the problems associated with conventional z-testing at the end of the graphics pipeline involve implementing different forms of z-testing earlier in the graphics pipeline in an effort to eliminate occluded pixels before those pixels undergo shading and texturing operations. However, such techniques do not implement z-testing on a granular enough level to discern accurately which pixels associated with a current primitive are visible or occluded relative to previously processed primitives. Consequently, such techniques typically generate a large number of "indeterminate" outcomes, which results in numerous pixels being processed in the graphics pipeline that are ultimately discarded at the end of the graphics pipeline as not being visible.

As the foregoing illustrates, what is needed in the art is a more effective z-testing technique in the earlier stages of the graphics processing pipeline.

SUMMARY OF THE INVENTION

One embodiment of the present invention sets forth a computer-implemented method for performing a z-culling operation within a graphics processing pipeline. The method includes determining a first z-range for a first portion of a coarse raster tile, where the first portion includes a plurality of pixels having a first set of pixel locations, retrieving from a memory a corresponding z-range related to a second set of pixel locations associated with the coarse raster tile, where the first set of pixel locations comprises a subset of the second set of pixel locations, and comparing the first z-range to the corresponding z-range to determine whether the plurality of pixels is occluded. If the plurality of pixels determined to be occluded, then the plurality of pixels is culled. If the plurality of pixels is determined to not be occluded, then the plurality of pixels is transmitted to a fine raster unit for further processing. The coarse raster tile has a plurality of portions, including the first portion, and those portions may be processed serially.

Other embodiments include a graphics processing pipeline that has different elements configured to implement at least the steps of the above method as well a computing device that includes a graphics processing pipeline that has different elements configured to implement at least the steps of the above method.

One advantage of the disclosed approach is that the effective z-ranges being tested across a raster tile when performing z-culling operations are reduced, which may reduce the number of "indeterminate" z-culling outcomes. As a result, the disclosed approach (i) may reduce the amount of unnecessary processing involving occluded pixels, (ii) may reduce unnecessary memory bandwidth consumption resulting from data transfers to and from frame buffer memory for occluded or tentatively visible pixels, and (iii) may reduce unnecessary power consumption related to processing occluded pixels and performing extraneous memory operations for occluded and tentatively visible pixels.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
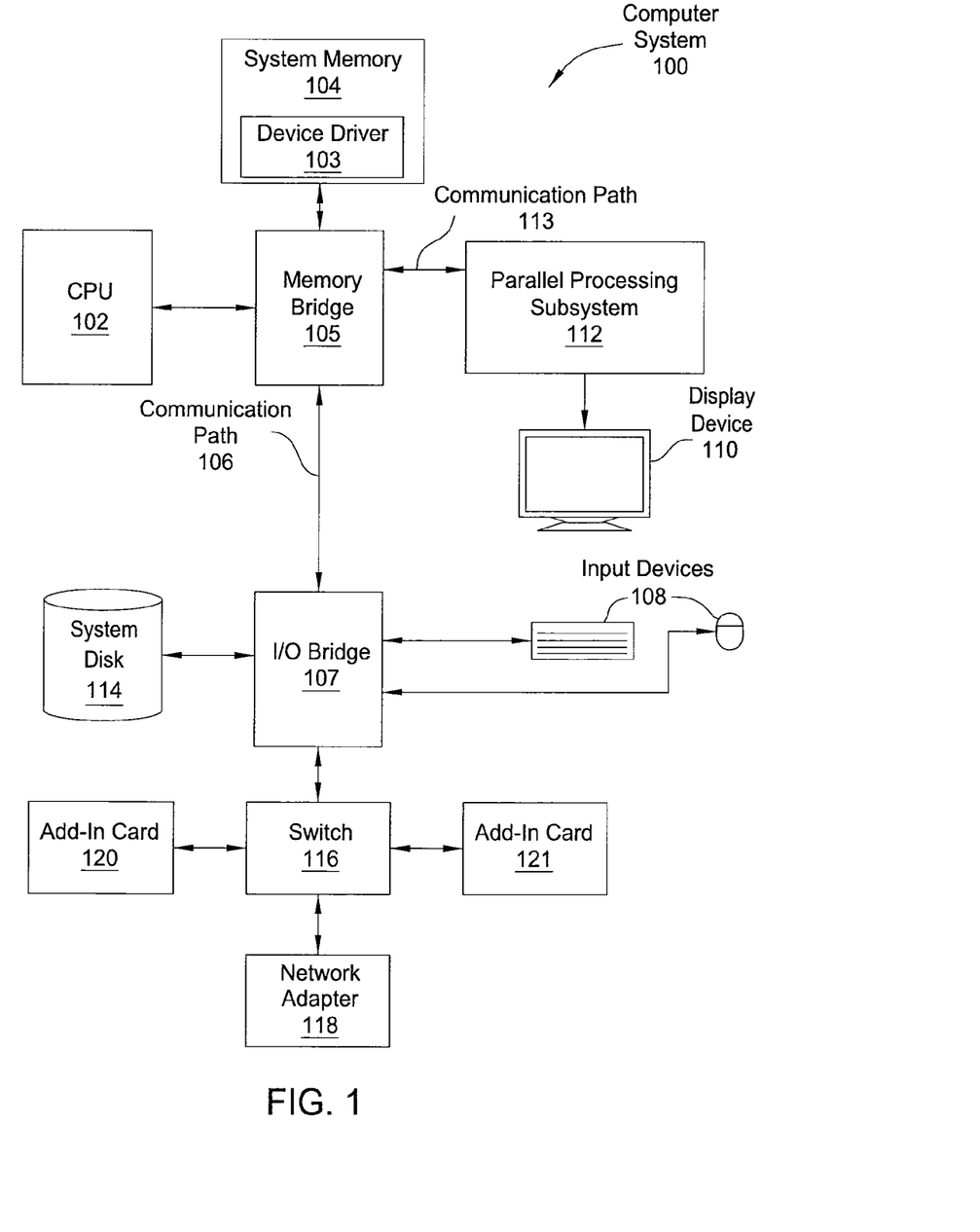
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbrige chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Improved Depth Estimation During Z-Culling

One approach for performing earlier z-testing in the graphics pipeline is to implement an initial z-test in a z-cull unit that resides between the rasterization stage and the pixel shading and texturing stages of the graphics pipeline. This z-culling process is somewhat analogous to the z-testing process previously described herein, except with z-culling, visibility is determined by comparing z-ranges associated with "tiles" of pixels, as opposed to comparing z-values associated with individual pixels. More specifically, for a given primitive being processed in the graphics pipeline, a coarse raster unit generates one or more "tiles" of pixels that are partially or fully covered by the primitive. For a given tile, the z-cull unit determines a z-range for the tile based on the z-values of the pixels included in the tile. The z-values of the pixels included in the tile are based on the portion of the primitive being processed that covers some or all of the pixel locations associated with the tile. The z-range reflects the maximum and minimum z-values associated with the tile.

The z-cull unit then compares the z-range for the tile against a corresponding z-range that is related to the tile and stored in a memory local to the z-cull unit. With respect to the corresponding z-range, in operation, for each pixel location associated with the tile, the depth value of the shallowest primitive previously processed in the graphics pipeline covering that pixel location is stored in the local memory. The corresponding z-range reflects maximum and minimum depth values stored in the local memory across all of the pixel locations associated with the tile. If the z-cull unit determines that the minimum z-value associated with the z-range of the tile is greater than the maximum z-value associated with the corresponding z-range, then the pixels of the tile are deemed to be occluded, and the current tile of pixels can be immediately discarded. As a result, processing time, memory bandwidth, and power are not wasted on occluded pixels. If the z-cull unit determines that the maximum z-value associated with the z-range of the tile is less than the minimum z-value associated with the corresponding z-range, then the pixels of the tile are deemed to be tentatively visible, and the pixels are transmitted through graphics pipeline for further processing. In addition, the pixels do not have to be z-tested at the end of the graphics pipeline, so the pixels can be written to the frame buffer after pixel shading and texturing operations have completed.

One drawback of this approach to z-culling emerges in situations where the z-range for the tile overlaps the corresponding z-range. In such situations, whether the pixels in the tile are occluded by pixels previously processed in the graphics processing pipeline is "indeterminate." Consequently, in order to avoid discarding potentially visible pixels, the entirety of the tile is transmitted through the graphics pipeline, so that all pixels included in the tile can be further processed. In these cases, ultimate visibility is still determined through conventional z-testing at the end of the graphics pipeline. Oftentimes, such an approach results in occluded pixels being fully shaded and textured in the pipeline before being discarded by virtue of the z-test at the end of the pipeline. This problem is very apparent when a portion of the z-range of the current tile lies behind the corresponding z-range. Here, the z-ranges indicate that at least one pixel (and most likely several pixels) in the tile is located behind pixels previously processed in the graphics pipeline. Yet, because the z-ranges overlap, resulting in an "indeterminate" outcome for the entire tile, all of the pixels included in the current tile, including the one or more occluded pixel, are transmitted through the graphics pipeline for further processing.

As the foregoing illustrates, while some efficiencies can be gained though z-culling, the overall effectiveness of z-culling can be compromised when there are a large number of "indeterminate" tiles. Further, the likelihood of overlap between the z-range for a tile and the corresponding z-range for that tile stored in memory increases as the size of the z-range for the tile increases. As described above, such overlap is the cause of "indeterminate" z-culling outcomes. In view of the foregoing, FIGS. 2-4 describe an approach to z-culling that reduces the effective z-ranges being tested across a tile, which reduces the likelihood of overlapping z-ranges and, consequently, reduces the incidence of "indeterminate" z-culling outcomes.

Figure 2:
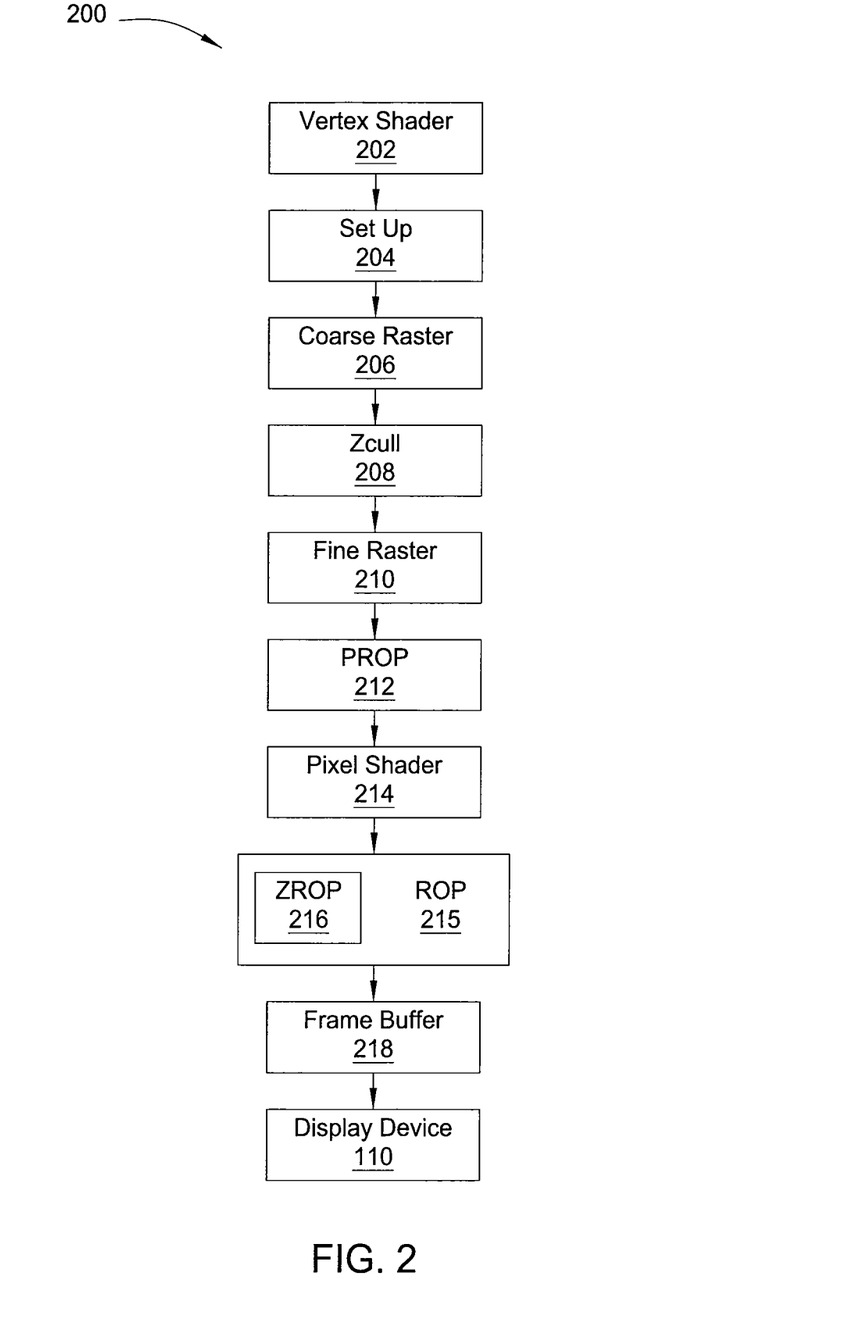
FIG. 2 is a conceptual illustration of a graphics processing pipeline that the parallel processing subsystem of FIG. 1 is configured to implement, according to one embodiment of the present invention.

FIG. 2 is a conceptual illustration of a graphics processing pipeline 200 that parallel processing subsystem 112 of FIG. 1 is configured to implement, according to one embodiment of the present invention. As shown graphics processing pipeline 200 includes, without limitation, a vertex shader 202, a set up unit 204, a coarse raster 206, a z-cull unit 208, a fine raster 210, a pre-raster operations unit ("PROP") 212, a pixel shader 214, a raster operations unit ("ROP") 215, a frame buffer 218, and a display device 110.

In operation, vertex shader 202 processes vertex data and related vertex attributes to produce graphics primitives that are to be processed in graphics processing pipeline 200. In some embodiments, vertex shader 202 also may perform clipping, culling, and/or viewport transform operations to filter out graphics primitives that are not visible in the final rendered image. The vertex shader 202 then transmits the processed vertex data and related geometry information associated with all potentially visible primitives to setup unit 204.

The setup unit 204 assembles the potentially viewable primitives based on the vertex data and related geometry information received from the vertex shader 202. In so doing, setup unit 204 may calculate certain parameters for each primitive such as, without limitation, color values, surface normal vectors, and transparency values at each vertex of a primitive. The setup unit 204 then transmits the processed primitives to coarse raster 206.

Coarse raster 206 typically processes primitives one at a time in serial fashion. For a given primitive, coarse raster 206 determines which pixels in the view plane the primitive covers and then computes attribute values for the covered pixels based on the attribute values related to the vertices of the primitive. Coarse raster 206 may implement scan conversion or any other technically feasible techniques when performing these computations. Among the attributes values computed for the covered pixels is the depth of each pixel, which reflects how far the primitive covering the pixel is from the view plane. As previously described herein, the pixel depth is also referred to as the "z-value" for the pixel. In one embodiment, after generating the pixel data based on the primitive being processed, coarse raster 206 aggregates the pixels into arrays or tiles, typically sized to 16 pixels by 16 pixels. Coarse raster 206 then divides each 16 pixel by 16 pixel into four 8 pixel by 8 pixel sub-tiles. Coarse raster 206 then transmits the 8 pixel by 8 pixel sub-tiles to z-cull unit 208 for depth testing.

In one embodiment, z-cull unit 208 receives a group of four 8 pixel by 8 pixel sub-tiles from coarse raster 206 associated with a 16 pixel by 16 pixel tile initially generated by coarse raster 206. Z-cull unit 208 then processes each of the four 8 pixel by 8 pixel sub-tiles serially, one 8 pixel by 8 pixel sub-tile per clock cycle. For a "current" 8 pixel by 8 pixel sub-tile being processed by z-cull unit 208, Z-cull unit 208 computes a z-range for that sub-tile. The z-range for the current sub-tile reflects the maximum depth value and minimum depth value associated with the particular portion of the primitive being processed that covers some or all of the pixel locations associated with the current sub-tile. Z-cull unit 208 also retrieves from a memory local to the z-cull unit 208 (not shown) a corresponding z-range related to the original (16 pixel by 16 pixel) tile of which the current sub-tile was part. As previously described herein, in operation, for each pixel location associated with the original tile, the depth value of the shallowest primitive previously processed in graphics processing pipeline 200 covering that pixel location is stored in the memory local to the z-cull unit 208. The corresponding z-range reflects the maximum and minimum depth values stored in the local memory across all the pixel locations associated with the original tile.

Z-cull unit 208 then compares the z-range for the current sub-tile against the corresponding z-range retrieved from the local memory. If the minimum z-value associated with the z-range for the current sub-tile is greater than the maximum z-value associated with the corresponding z-range retrieved from local memory, then all pixels included in the current sub-tile are deemed to be occluded. If occluded, then the pixels can be discarded or "culled," meaning that no further processing is performed on the pixels. If the maximum z-value associated with the z-range for the current sub-tile is less than the minimum z-value associated with the corresponding z-range, then the pixels included in the current sub-tile are deemed to be tentatively visible. If tentatively visible, then the pixels are "trivially accepted" for further processing in graphics processing pipeline 200. In addition, the pixels are flagged to avoid further z-testing in subsequent stages of the graphics processing pipeline 200. Lastly, if the z-range associated with the current sub-tile overlaps the corresponding z-range, then the visibility of the pixels included in the current sub-tile is "indeterminate," and those pixels are further processed and z-tested in subsequent stages of graphics processing pipeline 200.

Coarse raster 206 is configured to test the z-range of each of the four 8 pixel by 8 pixel sub-tiles corresponding to a given 16 pixel by 16 pixel tile in the manner described above. Again, in one embodiment, coarse raster 206 is configured to process a different one of the 8 pixel by 8 pixel sub-tiles per clock cycle such that the group of four 8 pixel by 8 pixel sub-tiles is processed over four clock cycles. For any group of sub-tiles processed by coarse raster 206, only the sub-tiles that are found to be either "indeterminate" or "trivially accepted" are passed to the fine raster 210 for further processing. The sub-tiles that are "occluded" are discarded or culled and not passed to the fine raster 210.

Fine raster 210 receives the unculled 8 pixel by 8 pixel tiles and generates fine-grained coverage data for each 8 pixel by 8 pixel tile. Fine raster 210 transmits the resulting fine raster tiles to PROP 212, which performs pre-raster operations, such as optimizations for color blending, pixel color data organization, and address translations, prior to shading and texturing. PROP 212 transmits the pixels included in each fine raster tile to pixel shader 214, where pixel shading and texturing (texture unit not shown) operations are performed. The shaded and textured pixels are then transmitted to ROP 215, where raster operations, such as stencil, z test, blending, and the like, are performed. ROP 215 also performs z-raster operations between incoming pixels and pixels stored in frame buffer 218.

In particular, for the pixels associated with an 8 pixel by 8 pixel sub-tile found to be "indeterminate," a z-raster operations unit ("ZROP") 216, which is included in ROP 215, performs a final z-test on each of the pixels received from pixel shader 214 against the corresponding pixel in frame buffer 218. Again, such z-testing is implemented to determine whether the processed pixel received from pixel shader 214 is visible relative to the corresponding pixel stored in frame buffer 214. As previously described herein, if the z-value of the pixel received from pixel shader 214 is less than the z-value of the corresponding pixel stored in frame buffer 218, then the pixel received from pixel shader 214 is in front of the corresponding pixel stored in frame buffer 218. Consequently, frame buffer 218 is updated to reflect the z-value of the pixel received from pixel shader 214. However, if the z-value of the pixel received from pixel shader 214 is greater than the z-value of the corresponding pixel stored in frame buffer 218, then the pixel received from the pixel shader 214 is behind the corresponding pixel stored in the frame buffer 218 and cannot be seen. Consequently, the pixel received from pixel shader 214 is discarded. Pixels associated with an 8 pixel by 8 pixel sub-tile found to be "trivially accepted" are stored directly in frame buffer 218 and are not z-tested by ZROP 216.

Once all pixels associated with a frame have been processed, the display surface stored in frame buffer 218 can be scanned out to display device 110 for display.

In an alternative embodiment, coarse raster 206 is configured to generate 16 pixel by 16 pixel tiles, as described above, but does not divide those tiles into 8 pixel by 8 pixel sub-tiles. Instead, coarse raster 206 transmits each 16 pixel by 16 pixel tile to z-cull unit 208 for processing. For a given 16 pixel by 16 pixel tile, z-cull unit 208 is configured to process an 8 pixel by 8 pixel subsection of the 16 pixel by 16 pixel tile per clock cycle. For a "current" 8 pixel by 8 pixel subsection, z-cull unit 208 computes a z-range for that current subsection. The z-range for the current subsection reflects the maximum depth value and minimum depth value associated with the particular portion of the primitive being processed that covers some or all of the pixel locations associated with the current subsection. Z-cull unit 208 also retrieves from the memory local to the z-cull unit 208 the corresponding z-range related to the original (16 pixel by 16 pixel) tile of which the current subsection is part, as previously described herein.

Z-cull unit 208 then compares the z-range for the current subsection against the corresponding z-range retrieved from the local memory. If the minimum z-value of the z-range for the current subsection is greater than the maximum z-value of the corresponding z-range, then the pixels included in the current subsection are deemed to be occluded. Again, if occluded, then the pixels can be discarded or "culled," meaning that no further processing needs to be performed on the pixels. If the maximum z-value of the z-range for the current subsection is less the minimum z-value of the corresponding z-range, then the pixels included in the current subsection are deemed to be tentatively visible. Again, if tentatively visible, then the pixels are "trivially accepted" for further processing in graphics processing pipeline 200. In addition, the pixels are flagged to avoid further z-testing in subsequent stages of graphics processing pipeline 200. Lastly, if the z-range for the current subsection overlaps the corresponding z-range, then the visibility of the pixels included in the current subsection is "indeterminate," and those pixels are further processed and z-tested in subsequent stages of graphics processing pipeline 200.

Z-cull unit 208 is configured to test the z-range of each of the four 8 pixel by 8 pixel subsections corresponding to a given 16 pixel by 16 pixel tile in the manner described above. In one embodiment, z-cull unit 208 is configured to process a different one of the 8 pixel by 8 pixel subsections per clock cycle such that the group of four 8 pixel by 8 pixel sub-tiles is processed over four clock cycles.

Similar to the sub-tile operations described above, in this alternative embodiment, each 8 pixel by 8 pixel subsections of a 16 pixel by 16 pixel tile is either deemed to be "occluded," "trivially accepted," or "indeterminate." Z-cull unit 208 then transmits the 16 pixel by 16 pixel tile with the associated z-range test results to an intermediary unit (not shown) residing in between z-cull unit 208 and fine raster 210 in the graphics processing pipeline 200. The intermediary unit is configured to divide the 16 pixel by 16 pixel tile into four 8 pixel by 8 pixel sub-tiles. The intermediary unit is configured to pass any 8 pixel by 8 pixel sub-tile deemed to be "trivially accepted" or "indeterminate" to fine raster 210 for further processing, as described above, and configured to discard or cull any 8 pixel by 8 pixel sub-tile deemed to be "occluded."

Figure 3A:
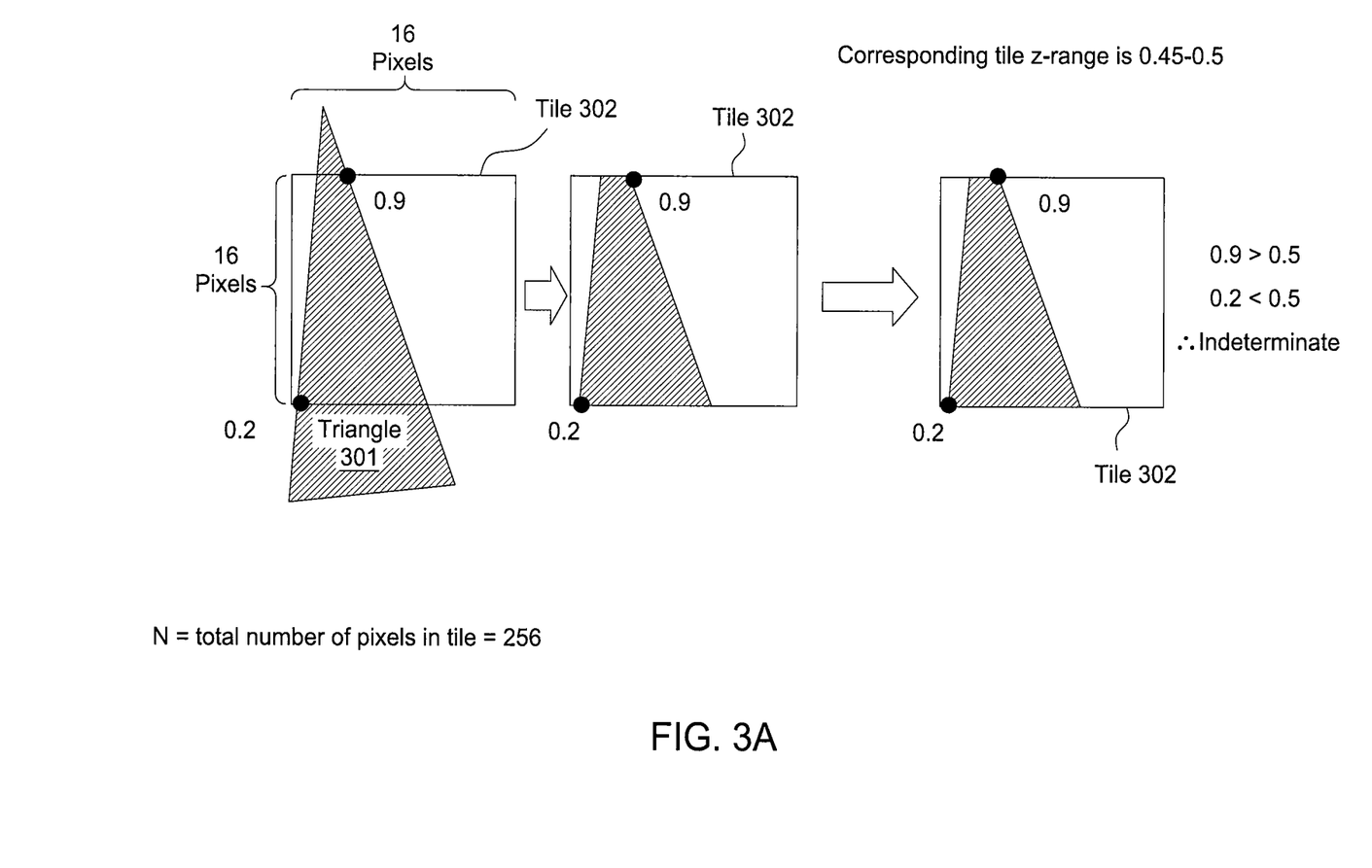
FIGS. 3A-3B are conceptual diagrams illustrating how z-culling operations are performed on a 16 pixel by 16 pixel raster tile, according to one embodiment of the present invention.
Figure 3B:
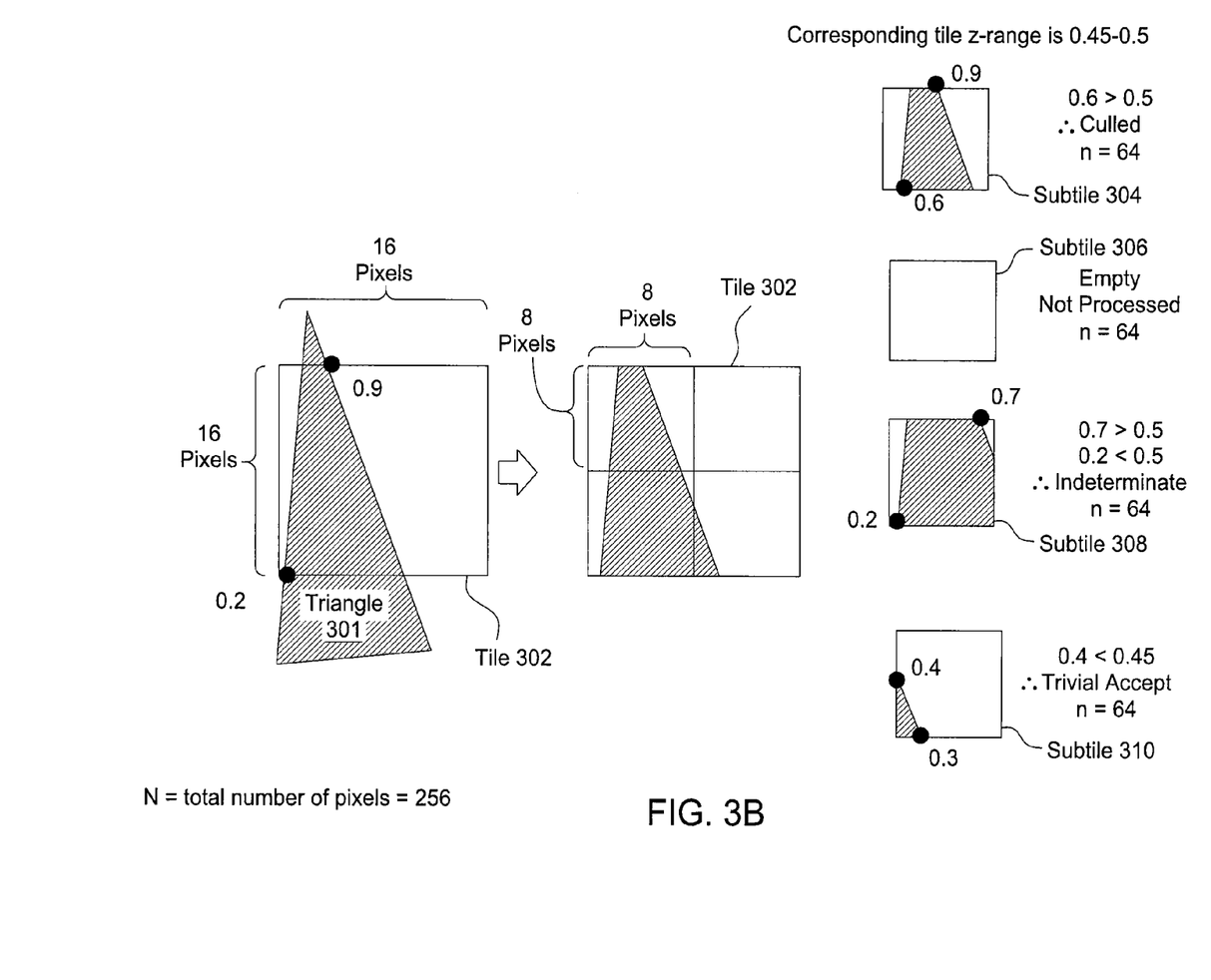

FIGS. 3A-3B are conceptual diagrams illustrating how z-culling operations on a 16 pixel by 16 pixel raster tile 302, according to one embodiment of the present invention. Specifically, FIG. 3A illustrates z-culling when raster tile 302 is processed as a whole. By contrast, FIG. 3B illustrates z-culling when raster tile 302 is first divided into sub-tiles.

As shown in FIG. 3A and previously described herein, tile 302 is generated during processing in coarse raster 206 and has dimensions of 16 pixels by 16 pixels. A triangle 301 covers a portion of tile 302. Z-cull unit 208 computes the z-range for tile 302. Again, the z-range for tile 302 reflects the maximum and minimum depth value associated with the particular portion of triangle 301 covering tile 302. Here, the minimum depth value associated with the particular portion of triangle 301 covering tile 302 is 0.2, and the maximum depth value associated with the particular portion of triangle 301 covering tile 302 is 0.9. Z-cull unit 208 also retrieves from a local memory a corresponding z-range related to current tile 302. For purposes of this illustration, the corresponding z-range related to tile 302 is assumed to be 0.45 to 0.5.

Z-cull unit 208 then compares the z-range of tile 302 with the corresponding z-range retrieved from memory to determine whether the pixels included in tile 302 are occluded or tentatively visible or whether occlusion or tentative visibility is indeterminate. In one embodiment if the minimum z-value associated with the z-range of tile 302 is greater than the maximum z-value associated with the corresponding z-range retrieved from memory, then all pixels included in tile 302 are deemed to be occluded and can be culled. If the maximum z-value associated with the z-range of tile 302 is less than the minimum z-value associated with the corresponding z-range retrieved from memory, then all pixels included in tile 302 are deemed to be tentatively visible. The pixels are then flagged as "trivial accepted" and are transmitted through graphics processing pipeline 200 for further processing. If the z-range of tile 302 overlaps the corresponding z-range, then whether the pixels are occluded or tentatively visible is indeterminate, and the pixels are transmitted through graphics processing pipeline 200 for further processing.

As shown, the z-range of tile 302, 0.2 to 0.9, overlaps the corresponding z-range retrieved from memory, 0.45 to 0.5. Therefore, whether the pixels included in tile 302 are occluded or tentatively visible cannot be determined. Consequently, all 256 pixels associated with tile 302 have to proceed through graphics processing pipeline 200 for further processing even though a number of the pixels are clearly occluded (those with depth values greater than 0.5) and will be culled by ZROP 216 at the end of the pipeline. With such an approach, unnecessary processing is performed on the occluded pixels, memory bandwidth is consumed unnecessarily via data transfers to and from frame buffer 218 to perform z-testing on the occluded pixels, and power is unnecessarily consumed by these superfluous processing and memory operations.

Turning now to FIG. 3B, the same tile 302 is now divided into four 8 pixel by 8 pixel sub-tiles prior to performing any z-culling operations. In one embodiment, coarse raster 206 is configured to divide tile 302 into sub-tile 304, sub-tile 306, sub-tile 308, and sub-tile 310, each including 64 pixels, and then transmit those sub-tiles to z-cull unit 208 for processing.

For a given or "current" sub-tile, z-cull unit 208 determines a z-range for the sub-tile, where the z-range reflects the maximum and minimum depth values associated with the particular portion of triangle 301 covering the current sub-tile. For example, assuming that sub-tile 304 is the current sub-tile, the minimum depth value associated with the particular portion of triangle 301 covering sub-tile 304 is shown to be 0.6, and the maximum depth value associated with the particular portion of triangle 301 covering sub-tile 304 is shown to be 0.9. Again, z-cull unit 208 also retrieves from the local memory the corresponding z-range related to tile 302. As before, the corresponding z-range related to tile 302 is 0.45 to 0.5.

Z-cull unit 208 then compares the z-range of sub-tile 304 with the corresponding z-range retrieved from memory to determine whether the pixels included in sub-tile 304 are occluded. Since the minimum z-value associated with the z-range of sub-tile 304, 0.6, is greater than the maximum z-value associated with the corresponding z-range retrieved from memory, 0.5, all pixels included in sub-tile 304 are deemed to be occluded and, therefore, can be culled. Consequently, the 64 pixels included in sub-tile 304 do not have to be processed any further in graphics processing pipeline 200. By contrast, in the approach described above with respect to FIG. 3A, these same 64 pixels would end up being processed in graphics processing pipeline 200.

Z-cull unit 208 processes each of the other three raster sub-tile in turn, comparing the maximum or minimum z-values associated with the z-range of the specific raster tile with the maximum or minimum z-values associated with the corresponding z-range of tile 302 retrieved from memory. Turning now to sub-tile 306, because no portion of triangle 301 covers this sub-tile, as shown, the 64 pixels in sub-tile 306 are culled and are not processed in graphics processing pipeline 200. Similar to sub-tile 304, in the approach of FIG. 3A, the 64 pixels of sub-tile 306 would be processed in graphics processing pipeline 200.

With respect to sub-tile 310, as shown, the maximum z-value associated with the z-range of sub-tile 310 is 0.4 which is less than the minimum z-value associated with the corresponding z-range retrieved from memory, 0.45. Therefore, all the pixels included in sub-tile 310 are deemed to be tentatively visible, and the pixels are flagged as "trivial accepted" for further processing in graphics processing pipeline 200. In addition, the 64 pixels included in sub-tile 310 are flagged to avoid further z-testing in subsequent stages of the graphics processing pipeline 200. By contrast, in the approach of FIG. 3A, these same 64 pixels would be processed and z-tested in graphics processing pipeline 200.

Sub-tile 308 illustrates the "indeterminate" case, where the z-range of the sub-tile 310, here 0.2 to 0.7, overlaps the corresponding z-range retrieved from memory, 0.45 to 0.5. The occlusion or visibility of the pixels included in sub-tile 308 is therefore "indeterminate," and the 64 pixels included in sub-tile 308 are processed and z-tested in graphics processing pipeline 200. For these 64 pixels, the outcome would be the same under both the approach of FIG. 3A and the approach of FIG. 3B.

As the foregoing illustrates, the approach of FIG. 3B results in substantially more efficient processing of the 264 pixels includes in tile 302 relative to the approach of FIG. 3A. Instead of processing and z-testing all 264 pixels in graphics pipeline 200, as would be the case in the approach of FIG. 3A, only 128 pixels are processed in graphics pipeline 200 and only 64 pixels are z-tested at the end of graphics pipeline 200. These efficiencies result from reducing the number of "indeterminate" outcomes from 264 pixels to 64 pixels by reducing the effective z-ranges being tested across tile 302 and, consequently, reducing the likelihood of an overlap with the corresponding z-range associated with tile 302 stored in the local memory. Reducing the incidence of "indeterminate" z-culling outcomes in this fashion reduces the unnecessary processing of occluded pixels, the unnecessary consumption of memory bandwidth related to data transfers involving occluded or tentatively visible pixels to and from the frame buffer, and the unnecessary consumption of power by processing occluded pixels and performing extraneous memory operations for occluded and tentatively visible pixels.

Figure 4:
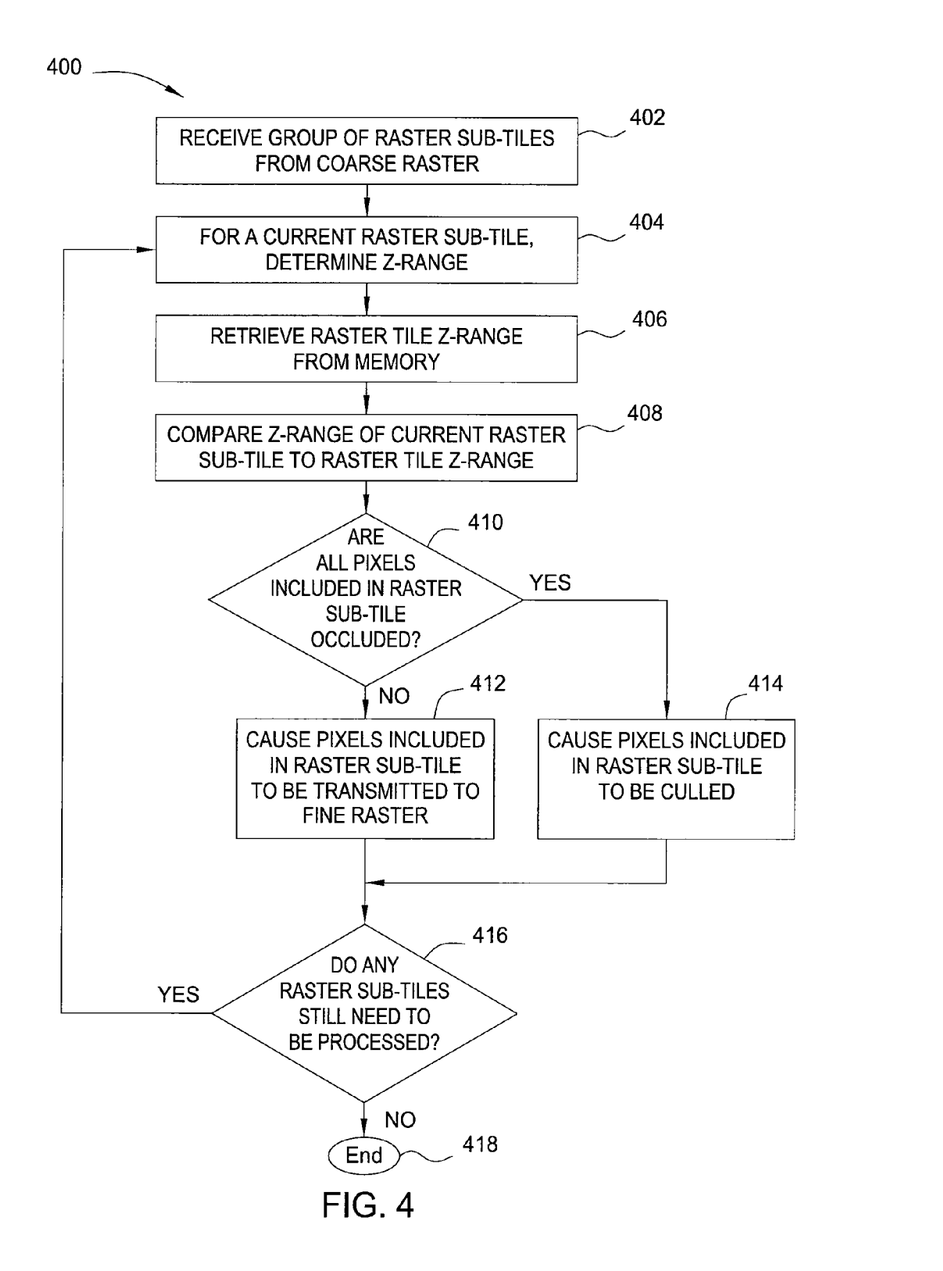
FIG. 4 sets forth a flow diagram of method steps for performing z-culling operations in a graphics processing pipeline, according to one embodiment of the present invention.

FIG. 4 sets forth a flow diagram of method steps for performing a z-culling operation within a graphics processing pipeline, according to one embodiment of the present invention. Although the method steps are discussed in conjunction with the systems of FIGS. 1-3, persons skilled in the art will understand that any system configured to perform the method steps, in any order, falls within the scope of the present invention.

As shown, a method 400 begins at step 402, where z-cull unit 208 receives a group of raster sub-tiles from coarse raster 206. As previously described herein, for a particular primitive being processed in graphics processing pipeline 200, coarse raster 206 is configured to generate at least one raster tile, such as a 16 pixel by 16 pixel raster tile, where the primitive being processed covers at least a portion of the pixel locations associated with each generated raster tile. In one embodiment, for a given generated raster tile, the coarse raster 206 is configured to divide the raster tile into a group of raster sub-tiles, such as four 8 pixel by 8 pixel raster sub-tiles. Coarse raster 206 is configured to then transmit the group of raster sub-tiles to z-cull unit 208 for processing.

At step 404, z-cull unit 208 determines a z-range for a first or "current" raster sub-tile included in the group of raster sub-tiles. The z-range for the current raster sub-tile reflects the maximum depth value and minimum depth value associated with the particular portion of the primitive being processed that covers some or all of the pixel locations associated with the current raster sub-tile. At step 406, z-cull unit 208 retrieves from a local memory a corresponding z-range related to the raster tile from which the current raster sub-tile was generated. In one embodiment, for each pixel location associated with the raster tile, the depth value of the shallowest primitive previously processed in graphics processing pipeline 200 covering that pixel location is stored in the local memory. The corresponding z-range reflects the maximum and minimum depth values stored in the local memory across all of the pixel locations associated with the raster tile.

At step 408, z-cull unit 208 compares the z-range of the current raster sub-tile with the corresponding z-range retrieved from memory to determine, at step 410, whether the pixels included in the current raster sub-tile are occluded. In one embodiment, if the minimum z-value associated with the z-range of the current raster sub-tile is greater than the maximum z-value associated with the corresponding z-range retrieved from memory, then all pixels included in the current raster sub-tile are deemed to be occluded. If the maximum z-value associated with the z-range of the current raster sub-tile is less than the minimum z-value associated with the corresponding z-range, then all pixels included in the current raster sub-tile are deemed to be tentatively visible. Lastly, if the z-range of the current raster sub-tile overlaps the corresponding z-range, then whether the pixels included in the current raster sub-tile are occluded or tentatively visible is indeterminate.

If, at step 410, the pixels included in the current raster sub-tile are not occluded, then the method 400 proceeds to step 412, where z-cull unit 208 causes the pixels included in the current raster sub-tile to be transmitted to fine raster 210 for further processing. In one embodiment, prior to transmitting the current raster sub-tile downstream in graphics processing pipeline 200 for further processing, z-cull unit 208 is configured to indicate whether the current raster sub-tile is "trivially accepted" (where the pixels are deemed to be tentatively visible) or "indeterminate" (where occlusion or tentative visibility is indeterminate). If, at step 410, all pixels are deemed to be occluded, then the method 400 proceeds to step 414, where z-cull unit 208 causes the pixels included in the current raster sub-tile to be culled such that no further processing is performed on those pixels.

At step 416, z-cull unit 208 determines whether any raster sub-tiles included in the group of raster sub-tiles received from coarse raster 206 still need to be processed. If z-cull unit 208 determines that one or more raster sub-tiles still need to be processed, then the method 400 returns to step 404, where z-cull unit 208 processes another raster sub-tile as described herein. If, however, z-cull unit 20 determines that no other raster sub-tiles need to be processed, then, at step 418, the method 400 ends.

A previously described herein, in an alternative embodiment, instead of coarse raster 206 dividing the raster tile into a group of sub-tiles, coarse raster 206 transmits the raster tile to z-cull unit 208. Instead of z-cull unit 208 processing one sub-tile per clock cycle, z-cull unit 208 is configured to process one subsection of the raster tile per clock cycle. Once z-cull unit 208 has finished processing all of the subsections of the raster tile, z-cull unit 208 transmits the raster tile to an intermediary unit residing within graphics processing pipeline 200 between z-cull unit 208 and fine raster 210. The intermediary unit is configured to divide the raster tile into raster sub-tiles and either cull the pixels included in a given raster sub-tile, if z-cull unit 208 indicates that the pixels included in the subsection of the raster tile corresponding to the raster sub-tile are occluded, or transmit the pixels included in the given raster sub-tile to fine raster 210 for further processing, if z-cull unit 208 indicates that the subsection of the raster tile corresponding to the raster sub-tile is "indeterminate" or "trivially accepted." Persons skilled in the art will thus recognize that method 400 may be applied to this alternative embodiment with only slight modification. In particular, instead of the various steps of method 400 being specific to raster sub-tiles, those steps may be made specific to subsections of a raster tile.

In sum, an improved z-culling technique is disclosed where a raster tile is divided into sub-tiles or logically divided into subsections before z-culling operations ensue. Instead of comparing the z-range of the entire raster tile against the corresponding z-range for the raster tile stored in local memory, the individual z-ranges of the sub-tiles or subsections are compared. With such an approach, the effective z-ranges being tested across the raster tile are reduced, which reduces the likelihood that all of the z-ranges being tested will overlap the corresponding z-range for the raster tile. Consequently, in many instances, the number of "indeterminate" z-culling outcomes can be reduced, which advantageously (i) reduces the amount of unnecessary processing involving occluded pixels, (ii) reduces unnecessary memory bandwidth consumption resulting from data transfers to and from frame buffer memory for occluded or tentatively visible pixels, and (iii) reduces unnecessary power consumption related to processing occluded pixels and performing extraneous memory operations for occluded and tentatively visible pixels.

Further, as one skilled in the art will recognize, the "level" of z-culling implemented pursuant to the disclosed technique may be controlled. For example, when greater z-culling capability is desired, the coarse raster tile may be divided into a greater number of sub-tiles or subsections for z-culling purposes. The trade-off is that z-culling operations may take longer since the sub-tiles or subsections are processed serially. Likewise, when faster z-culling operations are desired, the coarse raster tile may be divided into fewer sub-tiles or subsections. Here, the trade-off is that the number of "indeterminate" z-culling outcomes may not be reduced as much as when z-culling operations are implemented using a greater number of sub-tiles or subsections.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. For example, the raster tiles, raster sub-tiles, and subsections described herein can be of any size or shape. Further, a given raster tile can be divided into any technically feasible number of sub-tiles or subsections. In addition, the functionality described herein can reside in any elements or units in graphics pipeline 200 and does not need to be confined to the coarse raster, z-cull unit or intermediate unit/element, as described above. The foregoing description and drawings are, accordingly, to be regarded in an illustrative rather than a restrictive sense.

Therefore, the scope of embodiments of the present invention is set forth in the claims that follow.

The invention claimed is:

1. A computer-implemented method for performing a z-culling operation within a graphics processing pipeline, the method comprising:
    determining a first z-range for a first portion of a coarse raster tile, wherein the first portion includes a plurality of pixels having a first set of pixel locations;
    retrieving from a memory a corresponding z-range related to a second set of pixel locations associated with the coarse raster tile, wherein the first set of pixel locations comprises a subset of the second set of pixel locations, and the first set of pixel locations has fewer pixel locations than the second set of pixel locations;
    comparing the first z-range to the corresponding z-range to determine whether the plurality of pixels is occluded; and
    if the plurality of pixels is determined to be occluded, then causing the plurality of pixels to be culled, or
    if the plurality of pixels is determined to not be occluded, then causing the plurality of pixels to be transmitted to a fine raster unit for further processing.

2. The method of claim 1, wherein the corresponding z-range reflects a maximum depth and a minimum depth associated with one or more shallowest primitives previously processed in the graphics processing pipeline and covering at least a portion of the second set of pixel locations.

3. The method of claim 2, wherein the first z-range reflects a maximum depth and a minimum depth associated with a current primitive being processed in the graphics processing pipeline and covering at least a portion of the first set of pixel locations.

4. The method of claim 1, wherein the plurality of pixels is determined to be occluded when a minimum z-value associated with the first z-range is greater than a maximum z-value associated with the corresponding z-range.

5. The method of claim 1, further comprising dividing the coarse raster tile into a plurality of sub-tiles prior to determining the first z-range or retrieving the corresponding z-range from memory, wherein the first portion comprises a first sub-tile included in the plurality of sub-tiles.

6. The method of claim 5, wherein the steps of determining, retrieving, comparing, and either causing to be culled or causing to be transmitted are performed for a different sub-tile included in the plurality of sub-tiles every clock cycle.

7. The method of claim 1, further comprising dividing the coarse raster tile into a plurality of sub-tiles after comparing the first z-range to the corresponding z-range to determine whether the plurality of pixels is occluded, wherein the first portion comprises a first subsection of the coarse raster tile.

8. The method of claim 1, wherein the steps of determining, retrieving, comparing, and either causing to be culled or causing to be transmitted are performed for a different subsection of the coarse raster tile every clock cycle.

9. The method of claim 1, wherein the plurality of pixels is determined to not be occluded, and further comprising:
    indicating that the first portion is trivially accepted when a maximum z-value associated with the first z-range is less than a minimum z-value associated with the corresponding z-range; or
    indicating that the first portion is indeterminate when the first z-range overlaps the corresponding z-range.

10. A graphics processing pipeline configured z-culling operations, the graphics processing pipeline comprising:
    a coarse raster unit configured to generate a coarse raster tile; and
    a z-cull unit configured to:
        determine a first z-range for a first portion of a coarse raster tile, wherein the first portion includes a plurality of pixels having a first set of pixel locations;
        retrieve from a memory a corresponding z-range related to a second set of pixel locations associated with the coarse raster tile, wherein the first set of pixel locations comprises a subset of the second set of pixel locations, and the first set of pixel locations has fewer pixel locations than the second set of pixel locations;
        compare the first z-range to the corresponding z-range to determine whether the plurality of pixels is occluded; and
        if the plurality of pixels determined to be occluded, then cause the plurality of pixels to be culled, or
        if the plurality of pixels is determined to not be occluded, then cause the plurality of pixels to be transmitted to a fine raster unit for further processing,
    wherein the coarse raster tile comprises a plurality of portions, including the first portion, and the portions included in the plurality of portions are processed serially.

11. The graphics processing pipeline of claim 10, wherein the corresponding z-range reflects a maximum depth and a minimum depth associated with one or more shallowest primitives previously processed in the graphics processing pipeline and covering at least a portion of the second set of pixel locations.

12. The graphics processing pipeline of claim 11, wherein the first z-range reflects a maximum depth and a minimum depth associated with a current primitive being processed in the graphics processing pipeline and covering at least a portion of the first set of pixel locations.

13. The graphics processing pipeline of claim 10, wherein the z-cull unit is configured to determine that the plurality of pixels is occluded when a minimum z-value associated with the first z-range is greater than a maximum z-value associated with the corresponding z-range.

14. The graphics processing pipeline of claim 10, wherein the coarse raster unit is further configured to divide the coarse raster tile into a plurality of sub-tiles, and transmit the plurality of sub-tiles to the z-cull unit for processing, wherein the first portion comprises a first sub-tile included in the plurality of sub-tiles.

15. The graphics processing pipeline of claim 14, wherein the z-cull unit is configured to repeat the determine, retrieve, compare, and either cause to be culled or cause to be transmitted operations for a different sub-tile included in the plurality of sub-tiles every clock cycle.

16. The graphics processing pipeline of claim 10, further comprising an intermediate element that resides between the z-cull unit and the fine raster unit and is configured to divide the coarse raster tile into a plurality of sub-tiles after the z-cull unit processes all subsections of the coarse raster tile, wherein the first portion comprises a first subsection of the coarse rater tile.

17. The graphics processing pipeline of claim 10, wherein the z-cull unit is configured to repeat the determine, retrieve, compare, and either cause to be culled or cause to be transmitted operations for a different subsection of the coarse raster tile every clock cycle.

18. The graphics processing pipeline of claim 10, wherein the plurality of pixels is determined to not be occluded, and the z-cull unit is further configured to:
   indicate that the first portion is trivially accepted when a maximum z-value associated with the first z-range is less than a minimum z-value associated with the corresponding z-range; or
   indicate that the first portion is indeterminate when the first z-range overlaps the corresponding z-range.

19. The graphics processing pipeline of claim 18, further comprising a z-raster operations unit that is configured to perform a z-test on each pixel in the plurality of pixels to determine whether the pixel should be written to a frame buffer memory when the first portion is indicated to be indeterminate.

20. A computing device, comprising:
   a memory; and
   a graphics processing pipeline that is coupled to the memory and includes:
      a coarse raster unit configured to generate a coarse raster tile; and
      a z-cull unit configured to:
         determine a first z-range for a first portion of a coarse raster tile, wherein the first portion includes a plurality of pixels having a first set of pixel locations;
         retrieve from a memory a corresponding z-range related to a second set of pixel locations associated with the coarse raster tile, wherein the first set of pixel locations comprises a subset of the second set of pixel locations, and the first set of pixel locations has fewer pixel locations than the second set of pixel locations;
         compare the first z-range to the corresponding z-range to determine whether the plurality of pixels is occluded; and
         determining whether to cull or process the first plurality of pixels based on whether the plurality of pixels is occluded.

* * * * *